(No. Model.)
E. BENJAMIN.
WOOD PLANING MACHINE.
No. 294,001. Patented Feb. 26, 1884.
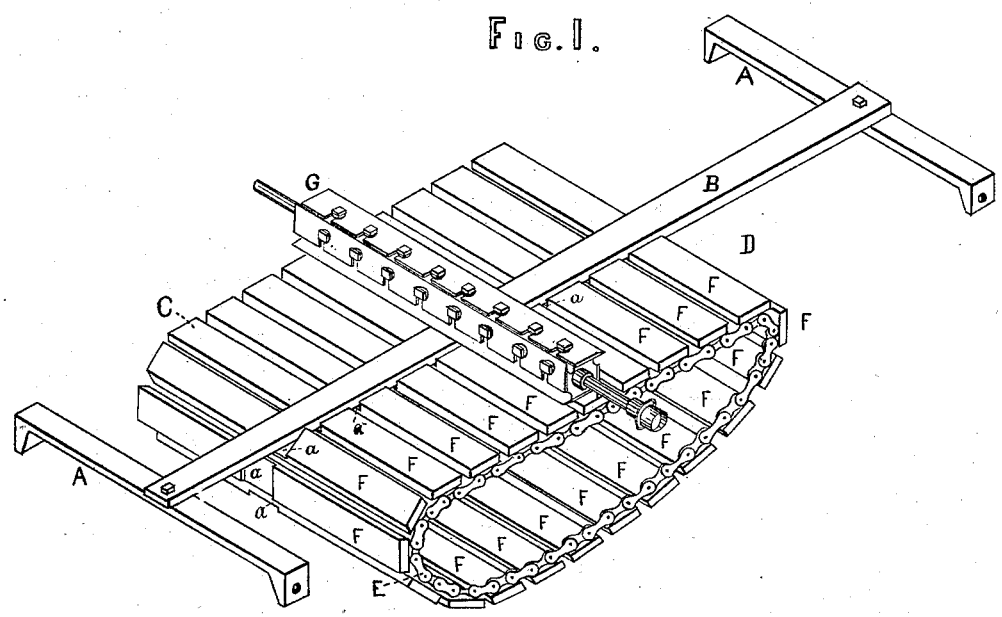
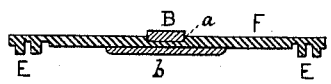
WITNESSES:
A. G. Morey.
Henry M. Shepard
INVENTOR
Edwin Benjamin
BY G. L. Chapin
ATTORNEY

UNITED STATES PATENT OFFICE.

EDWIN BENJAMIN, OF SOUTH EVANSTON, ILLINOIS.

WOOD-PLANING MACHINE.

SPECIFICATION forming part of Letters Patent No. 294,001, dated February 26, 1884.

Application filed May 23, 1883. (No model.)

*To all whom it may concern:*

Be it known that I, EDWIN BENJAMIN, of South Evanston, in the county of Cook and State of Illinois, have invented new and useful Improvements in Wood-Planers, of which the following is a specification, reference being had to the accompanying drawings, illustrating the improvement, in which—

Figure 1 is a perspective representation of a planer-bed, a portion of the supporting-frame, a cutter-head, and my wedge-shaped guide in position as when in use; Fig. 2, a longitudinal section through one of the slats to the rotary planer-bed, and a cross-section of the wedge.

The present invention relates to a device to be attached to or applied to a planer-bed to guide dimension stuff in line through the machine; and it is especially adapted to the guiding of two pieces on the bed at a time.

In running lumber through a planer, a difficulty is found in directing it in a line, because of a greater resistance to the knives of the cutter-head by the uneven thickness of the lumber or knots at the edges thereof, and other causes, the stuff moving in curved lines, and coming from the machine at different angles. In rotary planer-beds I remedy this difficulty by a flat strip of tapered metal let into the slats of the bed and fastened at its ends to the transverse frame-work of the machine, said strip projecting above the bed to a less height than the thinnest lumber to be planed is thick, so that at all times the cutting-bits will not come in contact with the guide—as, for instance, if the thinnest lumber to be planed is a half-inch, the guide may project above the bed three-eighths of an inch. For stationary planer-beds the tapered guide may be fastened to it by screws or recessed into it and fastened.

I am aware that parallel guides are an ordinary mechanism not only in planers, but in wood-working machinery; but I find these guides wholly insufficient for accurate work, because there is no draft in the knives to hold the edge of the board to the straight guide. The action of my tapered guide is to shorten the length of the cutting-surface of the knives from the guide outward gradually from the feed end thereof to the wider end, whereby the board is discharged from the machine on the same angle that is formed by the guide's edges.

The form adopted for carrying out the principle involved is as follows:

A A represent the end cross-frame pieces of an ordinary planer. To these frame-pieces is bolted my tapered guide B, which is made about three-fourths of one inch thick, three inches wide at the mid-length of the planer-bed, and tapered to about three-sixteenths of one inch to the foot.

C represents the end of the flat part of the feed end of the bed, and D the end of the flat part of the delivery end thereof. Now, as the guide is wider at the delivery end than at the feed end of the bed, the gains $a$ should be formed correspondingly long, so as not to wedge fast.

E represents the endless chains, and F the slats, to the bed of a well-known planer. In order to retain proper strength to these slats after the gains $a$ are formed therein, each one is cast with a rib, $b$, thereon, as shown at Fig. 2. In practice, planer-beds for general surfacing can be made in this form. The guide B, being removed for planing wide stuff, does not leave so much unbearing-surface as to produce any unfavorable result, while at the same time a great advantage is attained in working dimension stuff.

The ordinary cutter-head is shown in position relative to the bed at G, the journals thereof and the driving-gear to the bed being omitted, because of their age in the art.

Having thus described my invention, I claim and desire to secure by Letters Patent of the United States—

As an improvement in planers for working wood, the tapered guide B, gained into the bed at $a$, and placed with its wider end to the delivery end of the machine, to shorten the cutting-length of the knives to the cutter-head gradually from the narrow to the wide end of the guide B, and thus forming a draft for the uniform delivery of stuff from the machine, as specified.

EDWIN BENJAMIN.

Witnesses:
G. L. CHAPIN,
A. G. MOREY.